June 24, 1930.  C. J. NASH  1,766,346
BEARING FOR BRAKE HANGERS
Filed Aug. 15, 1927
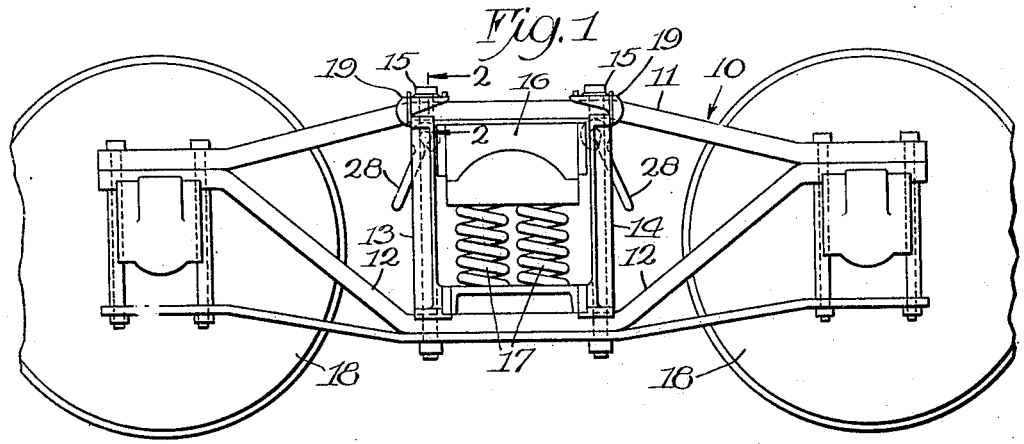
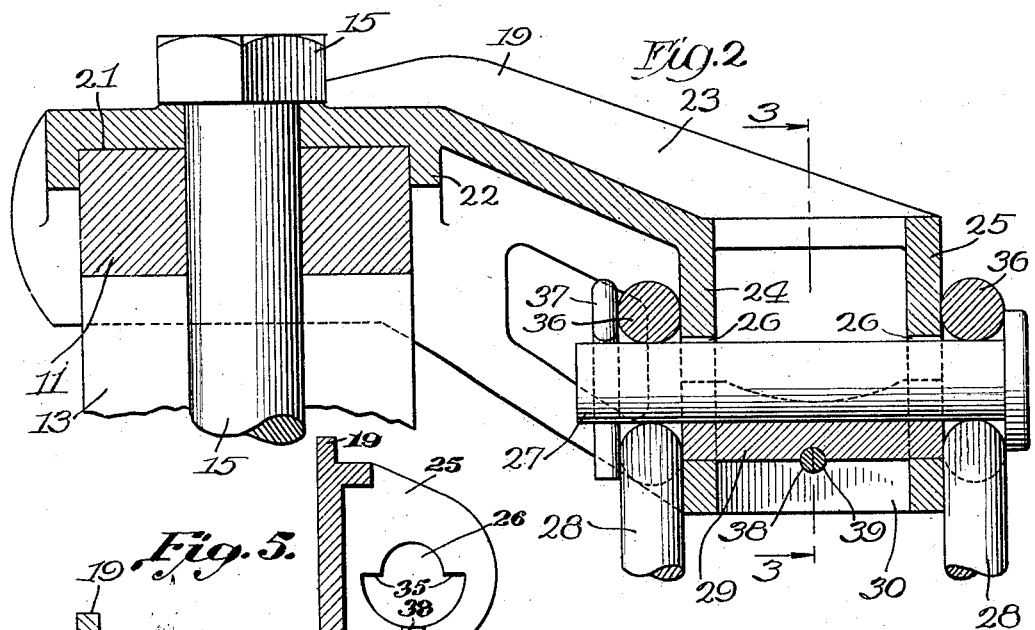
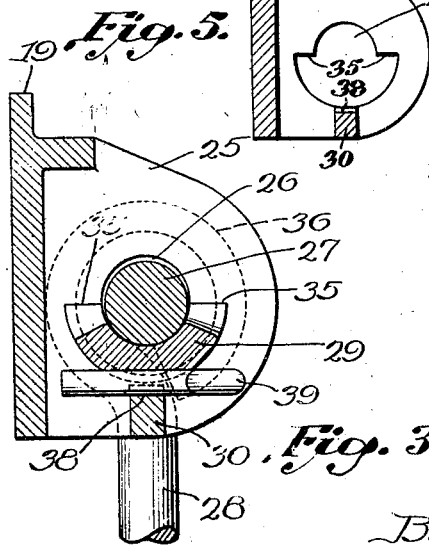
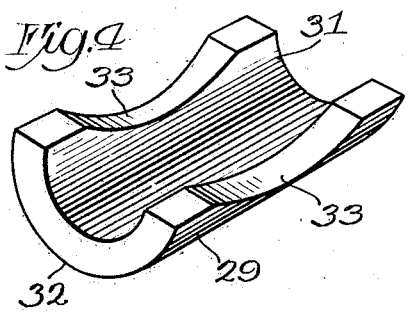
Inventor:
Charles J. Nash
By Gillson, Mann Hoxie Attys.

Patented June 24, 1930

1,766,346

UNITED STATES PATENT OFFICE

CHARLES J. NASH, OF CHICAGO, ILLINOIS, ASSIGNOR TO UNIVERSAL DRAFT GEAR ATTACHMENT COMPANY, A CORPORATION OF ILLINOIS

BEARING FOR BRAKE HANGERS

Application filed August 15, 1927. Serial No. 212,870.

This invention relates to hangers for railway brakes and the like.

The principal object of the invention is the provision of a removable bearing for brake hangers and like devices.

Another object of the invention is the provision of a novel bearing having new and improved means for securing the same in position.

A further object of the invention is the provision of a new and improved bearing and means for securing the same in position, that is cheap to manufacture, easily removed or installed, efficient in operation, and that is composed of a minimum number of parts.

Other and further objects and advantages of the invention will appear from the following description taken in connection with the accompanying drawings, in which:

Fig. 1 is a side elevation of a portion of truck for a railway car, showing the invention in position thereon;

Fig. 2 is a section on line 2—2 of Fig. 1;

Fig. 3 is a section on line 3—3 of Fig. 2;

Fig. 4 is a perspective view of the bearing member; and

Fig. 5 is a view similar to Fig. 3, with the bearing, hanger and retainer pin removed.

Referring now to the drawings, the reference character 10 designates a railway truck comprising upper and lower arch bars 11 and 12 and the columns 13 and 14 inserted between the arch bars and held in position by the bolts 15. The bolster is shown at 16, the springs at 17 and the wheels at 18. Since the truck is of the usual or any approved construction, a further detailed description of the same is deemed unnecessary.

The continued hammering of the bolster 16 against the columns 13 and 14 often causes the same to spread apart. A device for preventing the spreading of these columns is disclosed in Mitchell Patent 1,639,348, issued August 16, 1927, and comprises a clip or anchoring device 19 having a slotted opening 21 therein, through which the upper arch bar 11 extends, and having a vertical hole through which the bolt 15 extends for holding the device in position with a shoulder 22 for engaging the upper end of the truck column for preventing the same from spreading outwardly.

Rigidly attached to the anchoring device is a brake hanger arm 23, which is provided with the spaced flanges 24 and 25 connected at their lower edges by a tie bar 30, which may be and preferably is, integral therewith, as shown.

The flanges 24 and 25 are provided with aligned openings 26 for the reception of a pin or bolt 27 for supporting the brake hanger link 28.

If the bolt be used without any bearing in the openings 26, there is considerable wear on the parts, and, as a result, the parts are likely to break after they become worn. In order to eliminate this difficulty, suitable means are provided for constituting an elongated bearing for the hanger supporting pin or bolt 27 whereby the wear on said pin or bolt will be distributed over an extended surface and reduced to a minimum.

As shown, a bearing member 29 is employed. It is curved at 31 on its upper side to receive the pin. In order to save metal its lower surface is also curved, as at 32, and portions of its sides are removed, as at 33.

The openings 26 through the flanges have their lower portions on the same curve as the outer surface 32. The upper portions of said openings are semi-cylindrical, and form with bearing 29 a circular opening for receiving the pin or bolt 27. In other words, the lower portions of the openings 26 are of greater diameter than the upper portion, whereby shoulders 35 are formed. These shoulders prevent the rotation of the bearing member 29 in the openings 26.

The brake hanger 28, which is U-shape, is provided with eyes 36 for receiving the pin 27, as is usual in such constructions. The pin is held in position by a cotter or like pin 37. The hanger will hold the bearing member in position, but additional means may be provided for this purpose, if desired. As shown, an opening 38 is made partly in the lower surface of the bearing member and partly in the tie bar 30, and a cotter or other pin 39 is inserted in said opening. The use of the cotter will insure the bearing member being held in proper position at all times, even when the hanger is removed.

Since the wear is all on the lower portion of the bolt 27, the intermediate portion of the bearing member may be removed, as at 33, without affecting the function of said bearing.

It is thought from the foregoing, taken in connection with the accompanying drawings, that the construction and operation of my device will be apparent to those skilled in the art, and that changes in size, shape, proportion and details of construction may be made without departing from the spirit and scope of the appended claims.

I claim as my invention:

1. A wear member for a brake hanger comprising a bearing block having a curved seat on one side thereof, and a transverse groove on the side of said block opposite to said seat for cooperating with a groove on a tie bar of a brake hanger for receiving a retaining pin.

2. In combination, a brake hanger support provided with parallel supporting members having aligned openings therethrough, said openings being non-circular, and a wear member having a curved bearing on one side thereof for receiving a brake hanger, and having its ends supported by and interlocked with, said openings.

3. In combination, a brake hanger having a pair of supporting members provided with aligned non-circular openings, a wear member having a curved surface for forming a bearing, said wear member having its ends engaging in said aligned openings for supporting and preventing rotation of said wear member, and means engaging said wear member intermediate the ends thereof for preventing longitudinal movement of said wear member through said openings.

4. In combination, a brake hanger support provided with a non-circular opening having a continuous marginal wall extending transversely therethrough, a wear member having a curved bearing on one side for receiving a brake hanger, said member being seated in said opening and prevented from rotation by the contour of said opening, and means for preventing longitudinal movement of said wear member.

In testimony whereof I affix my signature.

CHARLES J. NASH.